Feb. 5, 1929.　　　　　　　　　　　　　　　　　　1,701,395
C. R. SHORT
AUTOMATIC GEAR TRANSMISSION
Filed Nov. 30, 1927　　　3 Sheets-Sheet 1
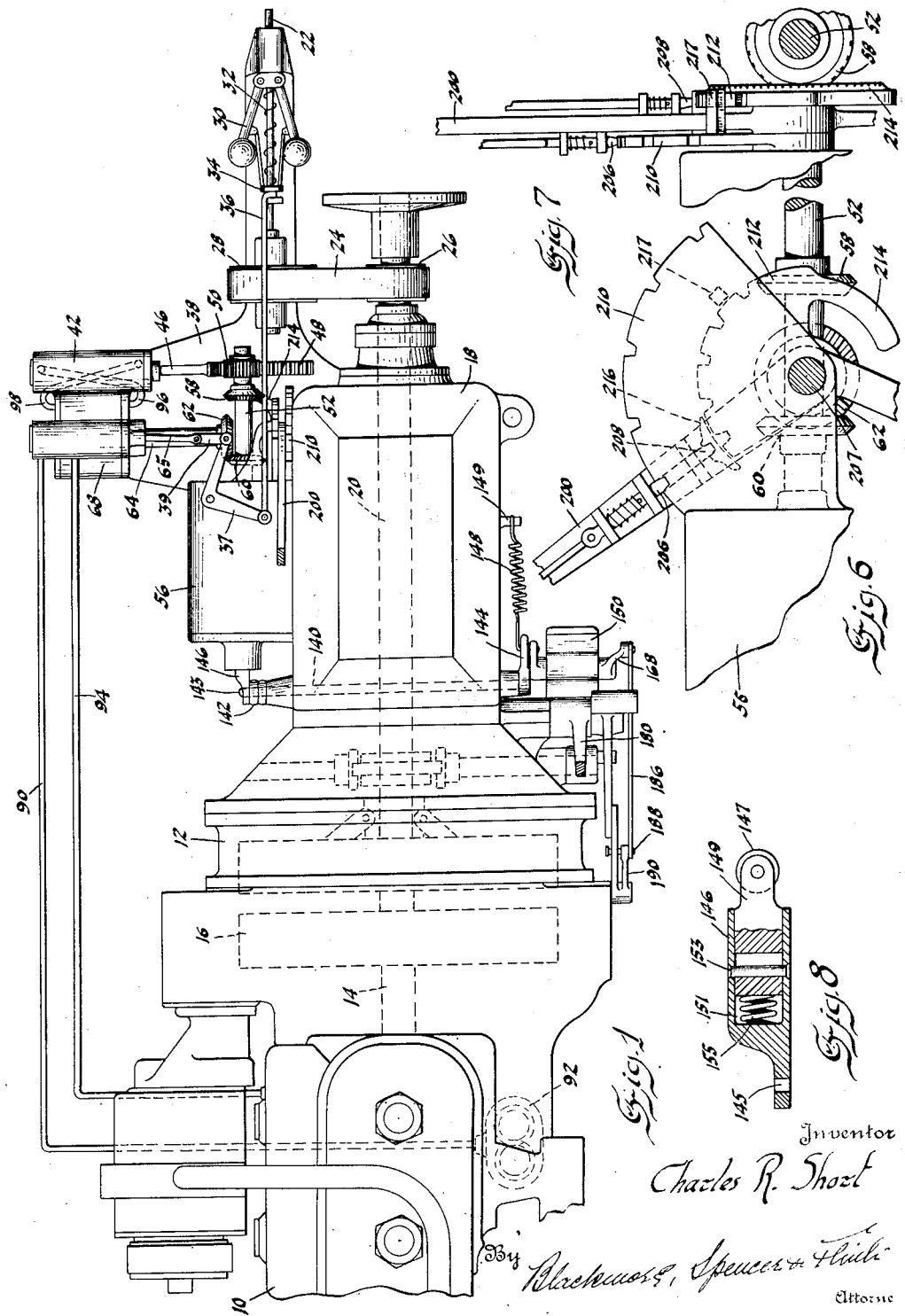
Inventor
Charles R. Short
By Blackmore, Spencer & Fluke
Attorneys

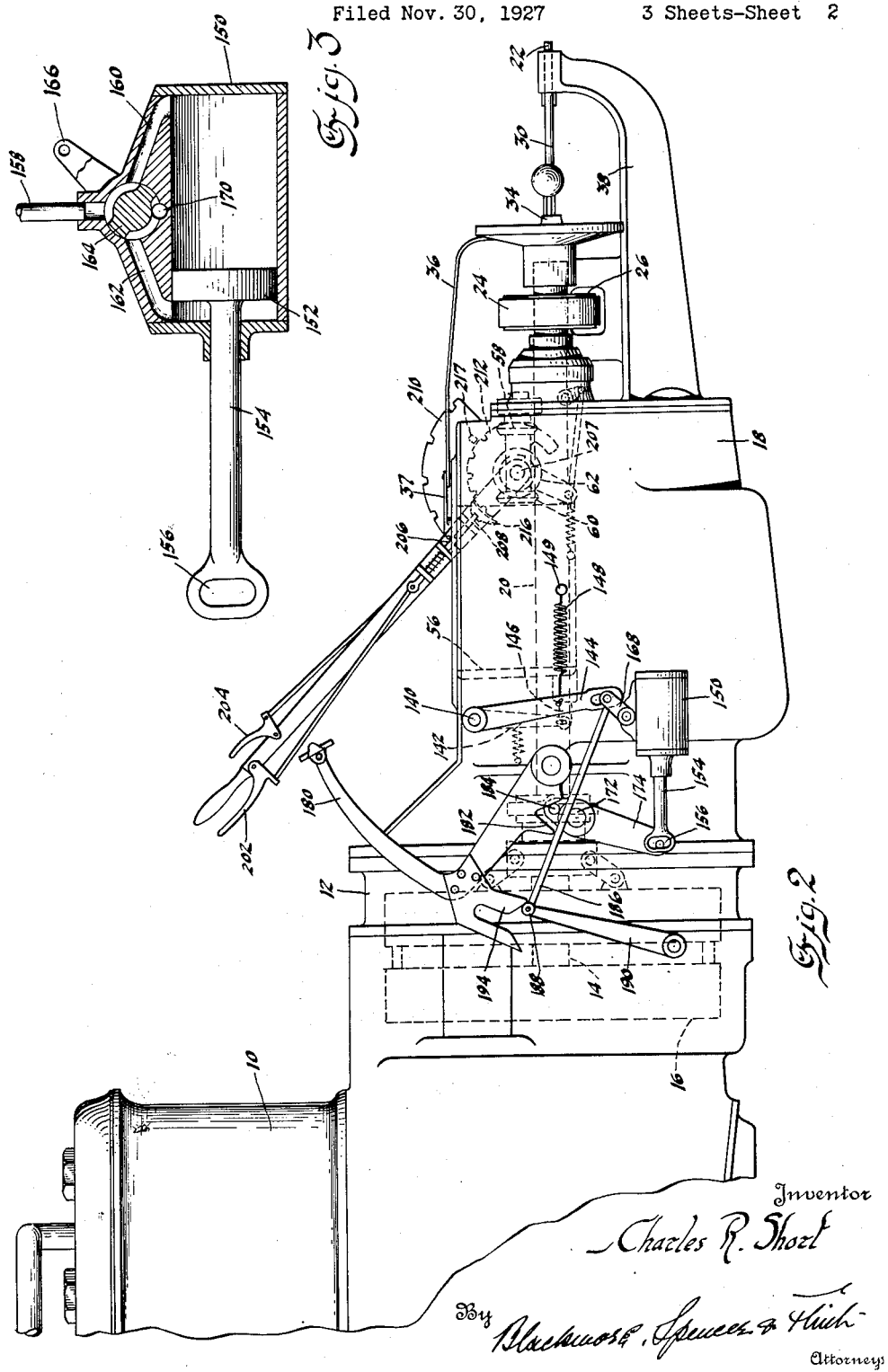

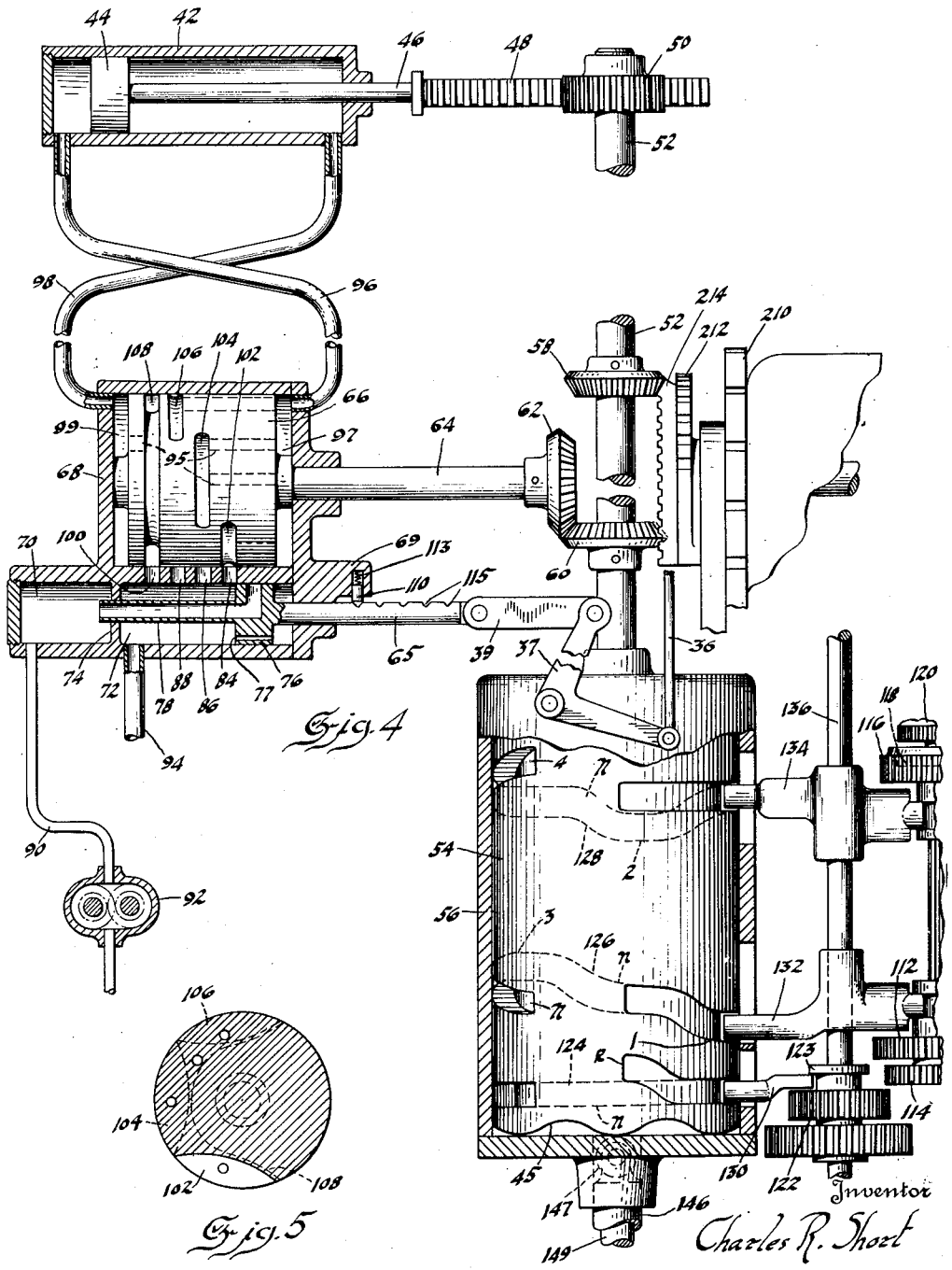

Patented Feb. 5, 1929.

1,701,395

UNITED STATES PATENT OFFICE.

CHARLES R. SHORT, OF DETROIT, MICHIGAN, ASSIGNOR TO GENERAL MOTORS CORPORATION, OF DETROIT, MICHIGAN, A CORPORATION OF DELAWARE.

AUTOMATIC GEAR TRANSMISSION.

Application filed November 30, 1927. Serial No. 236,775.

This invention relates to change speed mechanism for an automotive vehicle.

In automotive vehicles which are started and stopped often, such as large busses, there is apt to occur a clash of gears which is very unpleasant to the passengers. This is especially true when the operator is careless and when the car is driven by constantly changing operators. It is an object of this invention to provide change speed mechanism in which the inconvenience occasioned by changing gears is reduced to a minimum.

It is a further object of the invention to provide change speed mechanism of this type which is operated automatically in changing from low gear up to the highest gear but which is operated manually in changing from high gear down to the lower gears. It is a further object of the invention to provide such gear shifting mechanism in which any shift can be accomplished manually and which can, if desired, be locked in gear to prevent the automatic shifting mechanism from operating.

Other objects and advantages of the invention will appear in the course of the following description, taken in connection with the accompanying drawing and appended claims.

In the drawings:

Figure 1 is a plan view of a portion of the engine and transmission mechanism embodying my invention.

Figure 2 is a side view of the same.

Figure 3 is a vertical longitudinal section through the hydraulic clutch operating lever.

Figure 4 is an enlarged plan view, partly broken away, showing more or less diagrammatically the automatic operating mechanism for shifting the gears.

Figure 5 is a longitudinal vertical section through the control drum, showing diagrammatically the arrangement of the grooves and inlet and outlet conduits.

Figure 6 is a side view of the shifting lever mechanism.

Figure 7 is an end view of the same.

Figure 8 is a detail view of the clutch control push rod.

Referring to the drawings, I have illustrated in Figure 1 a conventional internal combustion engine 10 to the rear end of which is rigidly fixed the usual housing 12 within which is carried the clutch mechanism. While my invention is not limited to any particular kind of clutch, I prefer to use the double clutch of the type shown and described in my copending application, Serial No. 158,628, filed January 3, 1927, to which reference may be had for further details.

Connected with the rear end 14 of the crankshaft is the flywheel 16 containing the clutch mechanism (indicated in outline only) and extending rearward through the transmission housing 18 is the propeller shaft 20. Mounted adjacent to and parallel with the propeller shaft is a small countershaft 22 which is driven by belt 24 running on pulleys 26 and 28 keyed to shafts 20 and 22 respectively. In this connection it may be noted that pulley 26 is mounted on the propeller shaft 20 in rear of the transmission mechanism so that the speed of countershaft 22 is proportional to the speed of the car and not the speed of the engine.

Shaft 22 is provided with a common toggle governor 30 held in extended position by coil spring 32 surrounding shaft 22. The forward links of the governor have fixed therewith a sleeve 34 provided with a central annular groove adapted to receive the bifurcated rear end of the pitman rod 36. Shaft 22 is journaled in bearings in platform 38 which is rigidly fixed with relation to transmission casing 18.

The pitman rod 36, the rear end of which connects with the sleeve 34, extends upward and forward where it is connected with one end of bell-crank 37 pivotally mounted on casing 56. The other end of bell-crank lever 37 is connected by a link 39 with a rod 64 extending within the upper portion of casting 68 for operation of the control mechanism as described in detail below.

Supported on platform 38 is the automatic control for the gear shift mechanism. This mechanism comprises a cylinder 42 in which is slidable a piston 44 connected with a rod 46 slidable in a bearing in the end of the cylinder and extending toward the propeller shaft. Rod 46 is provided for a portion of its length with teeth 48 in mesh with the teeth of pinion 50 keyed to shaft 52. Shaft 52 is keyed to gear shift drum 54 journaled in casing 56 and is provided intermediate its ends with beveled gears 58 and 60, the latter of which is in mesh with beveled gears 62 keyed on shaft 64 connected with the cylindrical control drum 66 for the gear shift mechanism.

Control drum 66 is journaled in casting 68 which is mounted on platform 38 adjacent casing 42. That portion of casting 68 containing drum 66 is cylindrical and permits rotation of drum 66. For purposes of illustration only, I have shown reservoirs 70 and 72 in Figure 4 as being in the same horizontal plane as the control drum 66 while it really is directly above drum 66, as shown clearly in Figures 1 and 2. Auxiliary reservoirs 70 and 72 are provided on one side of the casting and are divided by the wall 74. Slidable in reservoir 72 is the valve member which comprises a plunger 76 provided with a stem 78 extending through and fitting snugly in a bearing in the wall 74. Plunger 76 is slidable but not rotatable in reservoir 72. The plunger 76 fits snugly in reservoir 72 but is not intended to perform a pumping action and hence the parts are constructed to permit the passage of fluid from one end of the reservoir 72 to the other. This may be accomplished by providing axially extending holes 77 in the plunger or reservoir or in any other desired manner. Plunger 76 and stem 78 are provided with a passageway therethrough constructed to connect reservoir 70 with one or three holes, 84, 86 and 88 arranged in a row in the side of reservoir 72 adjacent drum 66. Reservoir 70 is connected with tube 90 connected with oil pump 92 and reservoir 72 connects with tube 94 leading to the oil basin in the crankcase. The oil pump 92 may be driven by the engine in any way desired, such as from the distributor shaft, or any suitable means for supplying a fluid under pressure to reservoir 70 may be used in place of that described.

It may be noted that the ends of the cylindrical control drum 66 are spaced slightly from the ends of the casting 68, thus providing spaces 97 and 99 which are connected by pipes 96 and 98 with the respective ends of the cylinder 42. Control drum 66 is provided with three circumferentially extending grooves 102, 104 and 106, these grooves being axially arranged to correspond with the holes 84, 86 and 88 respectively. The angular spacing of the grooves is shown diagrammatically in Figure 5, by reference to which it is noted that each groove ends where the next one begins. Each groove is connected by a separate axially extending conduit 95 with the space 97. All three grooves combined cover an angular distance of a little over a half of a circle. This same angular distance is covered by the exhaust groove 108 connected with end space 99 by axially extending conduit 95, this exhaust groove registering with opening 100 leading into reservoir 72.

The cover of casting 68 is formed with an extended portion 69 provided with a recess containing a slidable dog 110 constantly urged outward by a coil spring 113. The dog is provided with a sharp edge adapted to fit in one of the five notches 115 in rod 65.

The mechanism just described is for the purpose of rotating the operating drum 54. This drum is designed to operate the gear shift mechanism shown and described in my copending application Serial No. 158,628 referred to above but is not limited to that particular construction as it may be modified to operate any gear shift mechanism capable of one or more speed changes. In the present transmission there are four forward speeds and one reverse. It is sufficient for the purposes of this application to state the general arrangement of the transmission gears. Slidably mounted on the main shaft 20 within the transmission housing, are two compound gears. The forward compound gear comprises pinions 112 and 114 while the rearward compound gear comprises pinion 116 and internal gear 118, the latter being adapted to mesh with pinion 120 mounted on the main shaft. The structure is illustrated as being in low gear. When gear 112, 114 is moved the width of one pinion rearward, or to the right as illustrated, the gears are in neutral. When it is moved the width of a pinion still further rearward, the mechanism is in third. When gears 116, 118 are moved forward, the gears are in second and when they are moved rearward from the illustrated neutral position to mesh gears 118 and 120, the mechanism is in fourth, or high gear. When both of these compound gears are in neutral, the compound gear 122 may be moved rearward to place the gears in reverse.

The clutch is of the double acting kind which contains two clutches only one of which can be connected at once. Mounted in the front end of the transmission casing 18 is a transverse shaft 140 provided on one end with a downward extending arm 142 and on the other end with a similar arm 144. Arm 142 carries a pin 143 extending through a vertical slot 145 in push rod 146 extending through the front end of casing 56 so that as rod 146 is reciprocated the shaft 140 is oscillated. Rocking of shaft 140 controls the hydraulic clutch operating mechanism described in detail below. A coil spring 148 connects arm 144 and a boss 149 on casing 18 and constantly urges the arm 144 and consequently rod 146 rearward.

The transmission mechanism and clutch mechanism are described in detail in my copending application referred to and a further description here is considered unnecessary.

Three circumferentially extending grooves 124, 126 and 128 are provided in drum 54 and these grooves receive the ends of the shifting levers or forks 130, 132 and 134 respectively, each of which extends through an axially extending slot in casing 56. The two rear forks 132 and 134 are slidable on counter-shaft 136 in the transmission casing 18 and are connected with the annular grooves in compound gears 112, 114 and 116, 118 respectively, while the end of the forward fork 130 is bifurcated and is held in the annular groove in the sleeve 123 which is fixed to the rear end of gear 122, which is rotatable and slidable on counter-shaft 136.

The gears are shifted by rotation of the drum 54 by mechanism described in detail below. The entire range of movement of drum 54 is about three-fourths of a circle. Since the cam grooves 124, 126 and 128 are instrumental in shifting the gears, I have given the zones of the grooves reference characters corresponding to the various gears. It may be noted that groove 124 has a long neutral zone N and a small zone R. Groove 126 has three neutral zones N and two active zones 1 and 3. Groove 128 has two neutral zones N and two active zones 2 and 4. In the position illustrated, the mechanism is in first. If the drum be rotated clockwise, as viewed from the front, fork 132 is moved rearward to neutral and forks 130 and 134 remain in neutral. Further clockwise movement of drum 54 moves fork 130 to the R or reverse zone. If the drum is moved anticlockwise from the position illustrated, fork 132 is moved to neutral and fork 134 to second. Further rotation moves fork 132 to third and fork 134 to neutral. During the next movement, fork 132 moves to neutral and fork 134 to fourth. During these shifts fork 130 remains in neutral.

The forward end of drum 54 is provided with a cam surface 45 cooperating with the roller 147 on the end or rod 146. By reference to Figure 8, it may be noted that rod 146 is composed of a rear part 149 carrying roller 147 and extending within the hollow or recessed portion 151, the parts being held together by pin 153 extending through an axially extending slot in the inner member 149 and riveted to the wall of the outer member 146. A strong coil spring 155 within outer member 146 constantly urges the two elements apart. The hills and dales of the cam surface 45 are so arranged that as the drum 54 is rotated so that fork 132 moves to neutral and fork 134 moves to second, the roller 147 moves down into a dale in cam surface 45. During the next shift the roller moves from the dale back to the hill. This movement acts through mechanism described below to cause a shift from one clutch to the other.

Mounted on the side of the transmission casing 18 is a hollow cylinder casting 150 provided with a cylindrical reservoir in which a piston 152 is reciprocably mounted. Fixed to the piston and extending through a bearing in the forward end of the casting 150 is a rod 154 provided at its forward end with a vertical slot 156. Extending into the top of casting 150 is a tube 158 connected with any suitable source of hydraulic pressure (not shown) such as an oil pump. Casting 150 is provided with two conduits 160 and 162 connecting tube 158 with opposite ends of the cylindrical reservoir, and mounted in the junction is a rotatable valve 164 having an inner arm 166 and an outer arm 168. Arm 166 carries a pin extending through the radially extending slot in the lower end of arm 144 carried on shaft 140. As shown in Figure 3, the pressure through pipe 158 is applied to the rear side of piston 152. Rotation of the valve 164, however, connects pipe 158 with conduit 162 and causes the pressure to be applied to the front end of the piston 152 to move it rearward. An outlet opening 170 is provided which connects the outlet conduit with the source of hydraulic pressure (not shown) so that the circuit will be complete.

Mounted in rear of the clutch housing 12 is the clutch operating shaft 172 having a crank arm 174 keyed thereto which is provided on its lower end with a pin extending through slot 156. As the piston 152 moves from one extreme to the other, shaft 172 is rocked to disconnect one clutch and connect the other. In the intermediate position of the piston, both clutches are disengaged.

Pivotally connected with the clutch housing is the pedal 180. This pedal is provided with a double cam surface 182 adapted to contact with a transversely extending pin 184 on the upper end of arm 174. Pivotally connected with the arm 168 is a rod 186 pivotally connected with a pin 188 fixed in the upper end of rocker arm 190 pivoted to the clutch housing 12. Pin 188 extends laterally and coacts with one side of double cam surface 194 on pedal 180. By this construction downward movement of pedal 180 acts through arm 174 to move piston 152 back to neutral and acts through arm 190, rod 186 and arm 168 to move the valve 164 to neutral position, in which it closes the two conduits 160 and 162. If the roller 147 happens to be on a hill on cam surface 45, the coil spring 155 in rod 146 permits a slight telescopic movement of the rod and thus permits the clutch to be moved to neutral.

The hand control for the gear shift mechanism comprises a hand lever 200 provided with pivoted hand grip levers 202 and 204 adapted to reciprocate spring-pressed dogs 206 and 208, respectively. The hand lever is pivoted on stub shaft 207 extending laterally from rack 210 fixed to the casing 56, rack 210 being provided with five equally spaced notches. Pivotally mounted in stud shaft 207 is an arcuate rack 212 provided with five notches spaced circumferentially to correspond to the notches in rack 210. Rack 212 carries fixed thereto the beveled gear 214, the racks 210 and 212 and gear 214 being concentric with shaft 207. Gear 214 is constantly in mesh with beveled gear 58 on shaft 52. Fixed to the fixed rack 210 are two bosses 216 and 217 which extend out in the same plane as the pivoted rack 212 so that they will contact dog 208. The front bar 216 ends just in front of the second notch in rack 212, as illustrated in Figures 2 and 6, while the forward side of boss 217 is positioned just in rear of the fourth notch in rack 212. With this structure, hand lever 200 can be moved rearward only to the fourth notch in rack 210 where it registers with the corresponding notch of rack 212. The rack 212 can thus be moved only two notches at a time. This prevents the operator from having to grope for the proper notch. The boss 217 may be placed so that the lever can be moved a greater or less number of notches if desired.

Boss 216 is extended forward so that it will hold dog 208 out of contact with rack 212 when lever 200 is in its forward position. The operation of my device will now be described. When the car is stationary, drum 54 will be in a position displaced clockwise, as viewed from the front, about 15 degrees from that illustrated. All the shifter forks will be in neutral and the clutch may be open or closed. When the engine is started, lever 200 is moved rearward to engage dog 208 in notch 216 and rack 212 is then rotated forward the angular distance between two adjacent notches. Lever 200 may then be put back in the illustrated position with dog 208 disengaged from rack 212. Rotation of rack 214 as described acts through bevel gear 58 to rotate gear shift drum 54 anti-clockwise to the position illustrated in Figure 4, thus moving fork 132 forward so that the transmission will be in first. During this movement, roller 147 was pushed forward by cam surface 45, thus rotating shaft 140 which rotates valve 164 forward. The hydraulic pressure through tube 158 then acts on the front side of piston 152 and moves the piston rearward, thus closing one of the clutches. The car then moves in first or low gear.

When a certain speed is attained, the governor exerts sufficient pull on rod 36 to overcome the resistance of spring pressed dog 110 and causes the engagement of dog 110 in the second notch in rod 65. This connects groove 102 with the passage way through plunger 76 and stem 78 and permits the fluid to flow through space 97 and tube 96 to force piston 44 along the cylinder 42. This movement acts through rod 46 and rack 48 and pinion 50 to rotate shaft 52 which rotates drum 54 just enough to shift from first to second and rotates drum 66 just sufficient for groove 102 to clear opening 84. The next movement of rod 65, due to increasing speed of the propeller shaft, causes plunger 110 to catch in the third notch in rod 65, thus moving plunger 76 to register with opening 86 and groove 104. This movement of piston 44 and drums 66 and 54 moves the gears from second to third. Each movement of the gears is accompanied by a shift from one clutch to the other through rod 46 as described.

The resistance of spring pressed dog 110 is sufficient to retard the movement of rod 65 so that when the force on rod 65 is sufficient to displace dog 110, it is sufficient to force rod 65 directly out so that the next notch is engaged by dog 110.

After plunger 76 passes opening 88, the drum 66 has rotated far enough so that none of the grooves register with the openings 84, 86, 88 or 100. When the car slows down, any change from high gear to a lower gear is accomplished manually by means of hand lever 200 as described. It may also be noted that hand lever 200 may be moved to engage any notch in rack 212 and any notch in rack 210 except the forward one to hold rack 212 and consequently gear shift drum 54 in any fixed position.

I claim:

1. In combination, a source of power and a drive shaft operated thereby, a propeller shaft, a transmission gear movable to change the speed of the propeller shaft relative to the speed of the drive shaft, a cylinder and a reciprocable piston mounted therein, means operated by the reciprocation of said piston for moving said transmission gear to change gears, a rotatable control drum mounted adjacent said piston and cylinder, an arcuate groove extending circumferentially of said drum and connected with said cylinder adjacent one end thereof, a reservoir adjacent said drum and provided with an aperture positioned to connect with said groove, a valve member within said reservoir movable to open or close said opening, means actuated by the increase in speed of the propeller shaft to predetermined point for moving said valve member to open position, and means actuated by the movement of said piston for rotating said drum to move said groove past registering position with said aperture.

2. A structure as recited in claim 1, and in combination therewith, manually operated means for adjusting the position of said drum.

3. Control means for a change speed operating shaft, comprising a cylinder and a piston, means operated by the movement of said piston for rotating said operating shaft, a control drum rotatably mounted in a cylinder adjacent thereto, and provided with an arcuate slot extending circumferentially thereof, said slot connecting by a passageway with the end of the drum cylinder and connecting with said first cylinder adjacent one end thereof, a reservoir for connection with a source of hydraulic pressure adjacent the drum cylinder and provided with an aperture registering with said groove, a valve within said reservoir movable to open or close said opening, and a driving connection between said control drum and operating shaft.

4. A structure as recited in claim 3 and in combination therewith, means for manually adjusting the position of the change speed operating shaft.

5. In combination, a source of power and a drive shaft operated thereby, a propeller shaft, transmission gears movable to change the speed of the propeller shaft relative to the speed of the drive shaft, a rotatable control drum mounted in a casing adjacent thereto and provided with a plurality of substantially circumferentially continuous, axially spaced grooves, a reservoir adjacent said drum and provided with axially spaced openings registering with said grooves, a plunger slidable in said reservoir and provided with a passageway therethrough adapted to register with either of said openings and connected at the other end with a source of fluid pressure, means operated by the passage of fluid through said grooves for moving said transmission gears, means operated simultaneously with said moving of the gears for rotating said control drum, and means controlled by the speed of the propeller shaft for moving said plunger to register with the respective openings.

In testimony whereof I affix my signature.

CHARLES R. SHORT.